(12) United States Patent
Malard et al.

(10) Patent No.: US 12,479,300 B2
(45) Date of Patent: Nov. 25, 2025

(54) METHOD FOR PROTECTING THE BATTERY OF A WHEEL UNIT FITTED TO A WHEEL OF A MOTOR VEHICLE

(71) Applicant: Continental Automotive Technologies GmbH, Hannover (DE)

(72) Inventors: Aurélien Malard, Toulouse (FR);
Fabien Deleplanque, Toulouse (FR);
Corine Raoul, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 88 days.

(21) Appl. No.: 18/441,550

(22) Filed: Feb. 14, 2024

(65) Prior Publication Data

US 2024/0286488 A1     Aug. 29, 2024

(30) Foreign Application Priority Data

Feb. 24, 2023   (FR) .................................. FR2301693

(51) Int. Cl.
*B60L 3/00*     (2019.01)
*B60K 1/04*     (2019.01)
(Continued)

(52) U.S. Cl.
CPC .............. *B60L 3/0046* (2013.01); *B60K 1/04* (2013.01); *B60K 7/0007* (2013.01); *G01R 31/385* (2019.01); *G01R 31/392* (2019.01); *B60K 2001/045* (2013.01); *B60K 2007/0092* (2013.01); *B60L 2240/547* (2013.01); *B60L 2250/16* (2013.01)

(58) Field of Classification Search
CPC ..................................................... B60L 3/0046
See application file for complete search history.

(56) References Cited

U.S. PATENT DOCUMENTS 6,756,892 B2    6/2004  Konchin et al.
9,579,961 B2 *  2/2017  Harris ..................... B60L 53/14
(Continued)

FOREIGN PATENT DOCUMENTS

FR       3 045 498 A1    6/2017
JP       2010-032408 A   2/2010

OTHER PUBLICATIONS

Search Report and the Written opinion of the Patentability of the Invention issued Sep. 18, 2023, by the France Patent Office in corresponding French Patent Application No. 2301693 with English translation. (9 pages).

*Primary Examiner* — Michael A Berns
(74) *Attorney, Agent, or Firm* — Buchanan Ingersoll & Rooney PC

(57) ABSTRACT

A method for protecting the battery of a wheel unit fitted to a wheel of a motor vehicle. The motor vehicle includes a central processing unit and the wheel unit includes at least a first sensor capable of measuring and of supplying an operating parameter of the wheel unit and a battery which supplies the wheel unit with power. The method including that the wheel unit transitions from an operational state to a non-operational state when the operating parameter reaches a predetermined upper threshold, and the wheel unit transitions from the non-operational state to the operational state when the operating parameter reaches a predetermined lower threshold.

13 Claims, 3 Drawing Sheets

(51) Int. Cl.
  *B60K 7/00* (2006.01)
  *G01R 31/385* (2019.01)
  *G01R 31/392* (2019.01)

(56) References Cited

U.S. PATENT DOCUMENTS

| | | | |
|---|---|---|---|
| 10,414,216 B2* | 9/2019 | Huard | B60C 23/0408 |
| 10,919,347 B2 | 2/2021 | Ghannam et al. | |
| 12,023,968 B2* | 7/2024 | Bill | B60C 23/0454 |
| 2008/0291002 A1 | 11/2008 | Katou | |
| 2018/0361802 A1 | 12/2018 | Huard et al. | |
| 2022/0055421 A1 | 2/2022 | Bill | |
| 2024/0286488 A1* | 8/2024 | Malard | B60C 23/0481 |

* cited by examiner

METHOD FOR PROTECTING THE BATTERY OF A WHEEL UNIT FITTED TO A WHEEL OF A MOTOR VEHICLE

CROSS REFERENCE TO RELATED APPLICATION

This application claims priority to French Patent Application 2301693, filed Feb. 24, 2023, the contents of such application being incorporated by reference herein.

FIELD OF THE INVENTION

The present patent application relates to a method for protecting the battery of a wheel unit fitted to a wheel of a motor vehicle, this method having applications notably in the field of tire monitoring systems for motor vehicles.

BACKGROUND OF THE INVENTION

For safety purposes, it is known practice to fit a motor vehicle with a monitoring system known by the abbreviation TPMS (tire-pressure monitoring system).

Such a monitoring system, which is, for example, described in the document FR3045498, incorporated herein by reference, generally comprises a central processing unit mounted on the vehicle and wheel units which are each fitted to an associated wheel of the vehicle.

The central unit comprises an electronic processor known by the abbreviation ECU (electronic control unit).

Each wheel unit comprises an electronic assembly of the integrated-circuit type which notably makes it possible to detect an anomaly of the wheel and to transmit, to the central unit of the vehicle, messages comprising data representative of operating parameters of the associated wheel and an identification code of the wheel unit concerned.

This electronic assembly generally comprises at least a power supply battery, a data storage memory, a tire inflation pressure sensor, a temperature sensor and a wheel acceleration sensor.

In addition, in order to ensure communication between the wheel units and the central processing unit, each wheel unit comprises a radio-frequency transmitter and the central unit of the vehicle comprises a complementary radio-frequency receiver.

In the event of a problem with radio-frequency reception of a signal coming from a wheel unit for a specified period, for example a period of ten minutes, the central unit of the vehicle raises a "silent wheel" warning.

The causes of such a reception problem are numerous and may notably come from an environment which disturbs radio-frequency communication, a malfunction of the central unit, or a malfunction of a wheel unit.

The malfunction of a wheel unit may come from a defect in a computer program or from the activation of the thermal protection of the wheel unit.

Indeed, a wheel unit is designed to operate in a given temperature range, outside which the unit no longer transmits a message to the central unit which will raise a "silent wheel" warning.

Raising a "silent wheel" warning usually results in negative client feedback on this wheel unit.

It is understood that using a battery outside its temperature range may cause a malfunction of the battery and of the wheel unit and a degradation of the battery.

Now, an important aspect of using a TPMS relates to the service life of the wheel units, and more particularly to the service life of the battery of each wheel unit. Thus, one challenge is to limit client feedback on the wheel units.

SUMMARY OF THE INVENTION

A notable aspect of the present invention is to preserve the integrity of the battery of each wheel unit, and to limit client feedback on the wheel units.

This aspect, as well as others which will become apparent upon reading the following description, is achieved with a method for protecting the battery of a wheel unit fitted to a wheel of a motor vehicle, said motor vehicle comprising a central processing unit and a radio-frequency receiver, and said wheel unit comprising at least:
  a first sensor capable of measuring and of supplying an operating parameter of the wheel unit,
  a transmitter adapted to transmit messages to the receiver from the central unit of the motor vehicle, and
  a battery which supplies the wheel unit with power,
  wherein, in the method:
  the wheel unit transitions from an operational state to a non-operational state when said operating parameter reaches a predetermined upper threshold, the transition to the non-operational state causing the activity of the wheel unit to be limited to a low level of consumption of power drawn from the battery, which low level makes it possible at least to monitor said operating parameter, and
  the wheel unit transitions from the non-operational state to the operational state when said operating parameter reaches a predetermined lower threshold, the transition to the operational state successively causing the activity of the wheel unit corresponding to a nominal level of consumption of power drawn from the battery to be re-established.

Thus, the method according to an aspect of the invention makes it possible to temporarily interrupt the operational state of the wheel unit with a view to preserving the integrity of the battery by limiting the stress on the battery when an upper threshold, such as an upper temperature threshold, is reached.

According to other optional features of an aspect of the invention, taken alone or in combination:
  the wheel unit transmits a first warning message to the central unit of the motor vehicle when said operating parameter reaches a predetermined critical threshold, upstream of the transition to a non-operational state. The first warning message makes it possible for the central unit to adapt its behavior accordingly;
  after the first warning message has been received, the central unit warns the driver of the motor vehicle of the imminence of a malfunction of the wheel unit by means of a first signal. This feature makes it possible for the central unit to warn the driver of the vehicle of the imminence of a malfunction of the wheel unit, the driver thus warned being able to adapt their driving accordingly;
  the transition to the operational state of the wheel unit causes a second warning message warning of a return to the operational state to be transmitted from the wheel unit to the central unit of the motor vehicle. The central unit, thus warned, will be able to adapt its behavior to the situation if necessary, for example by relaunching a phase of partially locating the wheel unit;
  the method comprises a step of resetting the wheel unit, which is carried out following the transition of the wheel unit to the operational state;

the method comprises a test of the integrity of the battery which is intended to check the integrity of the battery following the return to the operational state of the wheel unit, and after transitioning through the non-operational state;

the integrity test consists in:

calculating a first voltage drop of the battery which corresponds to the difference between a first no-load voltage and a first on-load voltage of the battery when the wheel unit is in its non-operational state, and before the activity of the wheel unit is limited, calculating a second voltage drop which corresponds to the difference between a second no-load voltage and a second on-load voltage of the battery when the wheel unit is in an operational state, following a transition to a non-operational state, and after the activity of the wheel unit at a nominal level of power consumption is re-established, and in calculating an integrity index which corresponds to the difference between the first voltage drop and the second voltage drop, and establishing a diagnosis of the integrity of the battery according to said calculated integrity index;

the first sensor is a temperature sensor and said operating parameter measured by the first sensor is a temperature;

the method incorporates a procedure of waking up the central unit which is provided in order to guarantee that the second warning message warning of a return to the operational state and the first warning message, to the central unit, are received correctly.

An aspect of the invention also relates to a motor vehicle which comprises at least a central unit and a wheel unit which are suitably programmed to implement the method described above.

BRIEF DESCRIPTION OF THE DRAWINGS

Other features, aims, aspects, and advantages of the invention will become apparent upon reading the following detailed description, in order to understand which reference will be made to the appended drawings, in which.

In all of these figures, identical or similar elements are denoted by identical or similar reference signs.

DETAILED DESCRIPTION OF THE PREFERRED EMBODIMENTS

Figure 1:
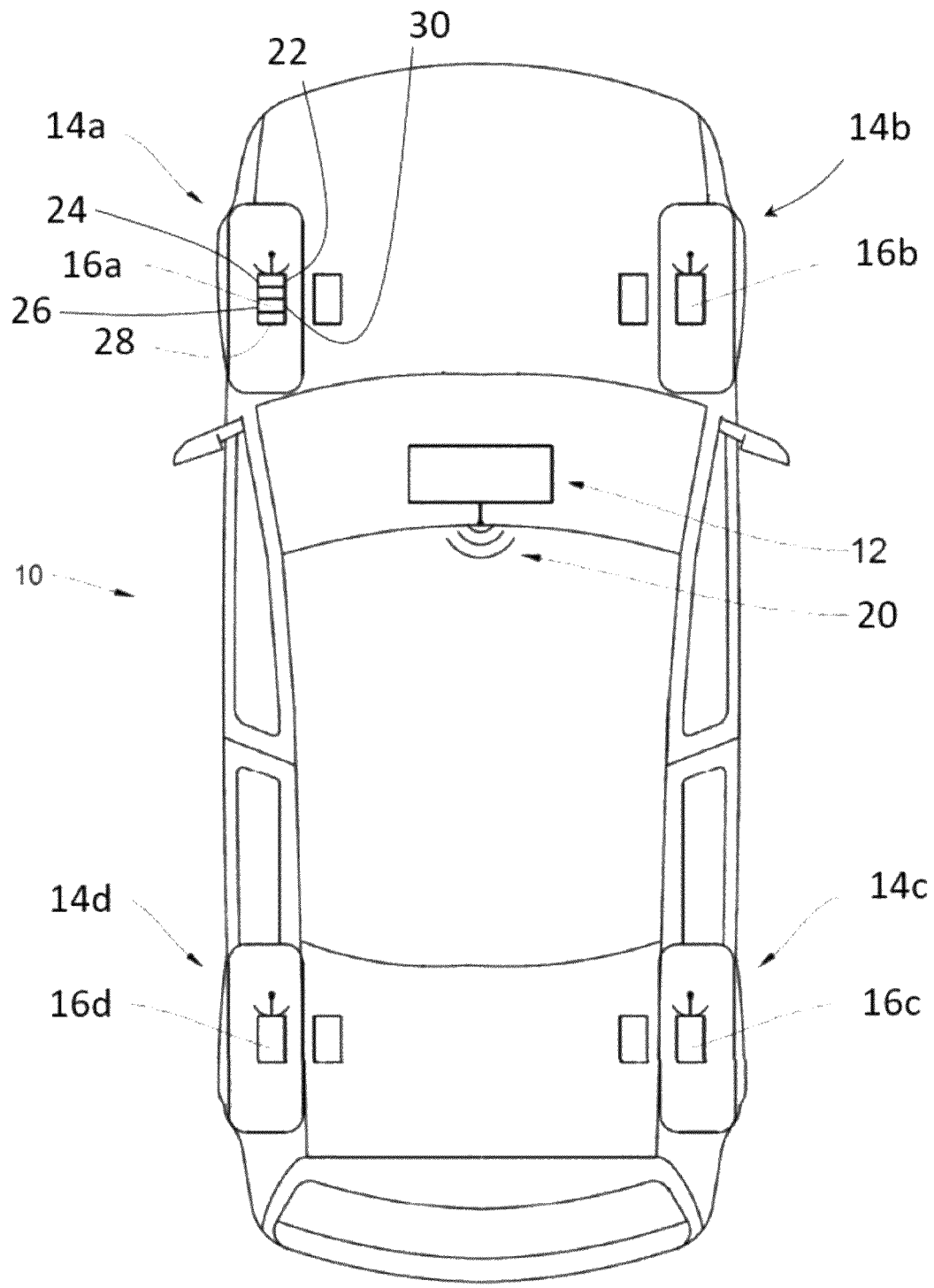
FIG. 1 is a schematic top view of a motor vehicle which comprises a TPMS and which implements a method for protecting the battery of a wheel unit, according to an aspect of the invention.

FIG. 1 depicts a motor vehicle 10 which comprises a central unit 12 and four wheels 14a, 14b, 14c, 14d which are each fitted with a respective wheel unit 16a, 16b, 16c, 16d.

In order not to weigh down the description, only one wheel unit 16a is described below, with the four wheel units 16a, 16b, 16c, 16d having a similar design and operation.

The wheel unit 16a belongs to a monitoring system of the TPMS type, standing for "tire-pressure monitoring system".

The central unit 12 of the motor vehicle 10 comprises an electronic processor (which is not shown) known by the abbreviation ECU (electronic control unit) and a memory (which is not shown).

Also, the central unit 12 comprises a radio-frequency receiver 20.

The wheel unit 16a comprises a casing which encloses a computer 22, a battery 24, a memory 26 and a transmitter 28.

The transmitter 28 of the wheel unit 16a is adapted to communicate and transmit messages to the central unit 12 via the receiver 20 of the central unit 12.

In addition, the wheel unit 16a comprises a set of sensors which are dedicated to measuring operating parameters of the wheel unit 16a.

This set of sensors comprises a first, temperature sensor 30 capable of measuring a temperature parameter T, a second sensor of the accelerometer type (which is not shown) capable of measuring the acceleration undergone by the wheel unit 16a, a third, pressure sensor (which is not shown) capable of measuring the inflation pressure of the tire of the associated wheel 14a, and a fourth sensor (which is not shown) for measuring the voltage at the terminals of the battery 24 of the wheel unit 16a.

The measurements taken by this set of sensors may be transmitted to the central unit 12 of the motor vehicle 10 via messages transmitted by the transmitter 28 of the associated wheel unit 16a.

An aspect of the invention notably relates to a method for protecting the battery 24 of the one wheel unit 16a, the central unit 12 and the wheel unit 16a being suitably programmed to implement the method according to an aspect of the invention.

It will be noted that the battery 24 of the wheel unit 16a is provided to operate within a temperature range determined by the manufacturer of the battery 24.

Using the battery 24 outside its temperature range may impair the correct operation of the wheel unit 16a and may, in particular, impair the radio-frequency communication between the wheel unit 16a and the central unit 12, preventing, for example, the central unit 12 from displaying the data relating to the wheel unit 16a on the dashboard of the motor vehicle 10.

The maximum temperature of the operating temperature range of the battery 24 given by the manufacturer of the battery 24 will be called the "manufacturer maximum temperature".

Also, the temperature beyond which the battery 24 is considered to risk deteriorating and/or no longer supplying enough power to ensure correct operation of the associated wheel unit 16a will be called the "maximum permissible temperature".

For example, for a maximum manufacturer temperature advertised at eighty-five degrees Celsius, the maximum permissible temperature for the battery 24 is considered to be eighty-five degrees Celsius plus a tolerance of three degrees Celsius, i.e. a maximum permissible temperature of eighty-eight degrees Celsius.

This additional tolerance makes it possible to take into consideration the inaccuracies of measurements of the temperature parameter T by the wheel unit 16a.

Figure 2:
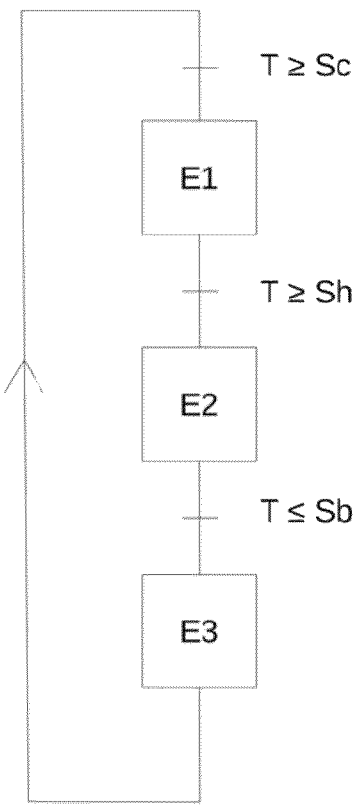
FIG. 2 is a flowchart which illustrates the unfolding of the steps of the method according to an aspect of the invention.

In accordance with the method according to an aspect of the invention, which is illustrated in FIG. 2, the wheel unit 16a transmits a first warning message M1 to the central unit 12 of the motor vehicle 10 during a step E1, when the temperature parameter T measured by the first temperature sensor 30 reaches a predetermined critical threshold Sc.

Preferably, the critical temperature threshold Sc is determined substantially to be below the maximum permissible temperature of the battery 24.

According to one example of an implementation of an aspect of the invention, the critical temperature threshold Sc is equal to the maximum permissible temperature minus an anticipation margin of three degrees Celsius, i.e. a critical threshold Sc of eighty-five degrees Celsius.

The anticipation margin is intended to act upstream of a transition to the non-operational state of the wheel unit 16a.

The first warning message M1 received by the central unit 12 enables the latter to warn the driver of the motor vehicle 10 of the impending malfunction of the wheel unit 16a by a first warning, such as a visual warning displayed on the dashboard of the motor vehicle 10.

The driver of the motor vehicle 10, thus warned of an imminent malfunction, may adapt their driving in order to reduce the current temperature of the wheel unit 16a, notably by limiting the use of the brakes in favor of the use of engine braking, for example.

Indeed, it is found that the wheel unit 16a may reach high temperatures when the brakes of the vehicle are heavily stressed, on a mountain road for example, the brakes transmitting their heat to the neighboring wheel unit 16a.

Still with reference to FIG. 2, the wheel unit 16a transitions from an operational state to a non-operational state during a step E2, when the current temperature parameter T measured by the first temperature sensor 30 reaches a predetermined upper threshold Sh.

"Operational state" is understood to mean a default state in which the wheel unit 16a is moving and in which the central unit 12 of the motor vehicle 10 is capable of receiving the messages transmitted by the wheel unit 16a.

According to one example of an implementation of an aspect of the invention, the upper temperature threshold Sh is equal to the maximum permissible temperature described above, i.e. eighty-eight degrees Celsius.

It will be noted that the upper temperature threshold Sh of transition to the non-operational state is above the critical threshold Sc.

In addition, the transition to the non-operational state of the wheel unit 16a causes, still during the step E2, the activity of the wheel unit 16a to be limited to a low level of consumption of power drawn from the associated battery 24.

"Low level" of power consumption is understood to mean a level of consumption of the wheel unit 16a which is reduced to the maximum by restricting the activities of the wheel unit 16a to the strict minimum, that is to say to monitoring the temperature parameter T.

The non-operational state of the wheel unit 16a makes it possible to minimize the consumption of power drawn from the battery 24, in order to preserve the capacities of the battery 24.

Indeed, with the power consumption associated with monitoring the temperature parameter T being minimal, the battery 24 is thus protected from leakage currents associated with excessive consumption outside its operating range.

Conversely, the wheel unit 16a transitions from the non-operational state to the operational state during a step E3, when the current temperature parameter T reaches a predetermined lower threshold Sb.

Preferably, the lower temperature threshold Sb is equal to the upper threshold Sh minus a constant value which makes it possible to distance the lower threshold Sb from the upper threshold Sh in order to avoid an effect of oscillations between the operational state and the non-operational state.

According to one example of an implementation of an aspect of the invention, the lower threshold Sb is equal to the upper threshold Sh minus six degrees Celsius, i.e. eighty-two degrees Celsius.

It will be noted that the lower threshold Sb, of transition to the operational state, is below the maximum manufacturer temperature of the battery 24.

Figure 3:
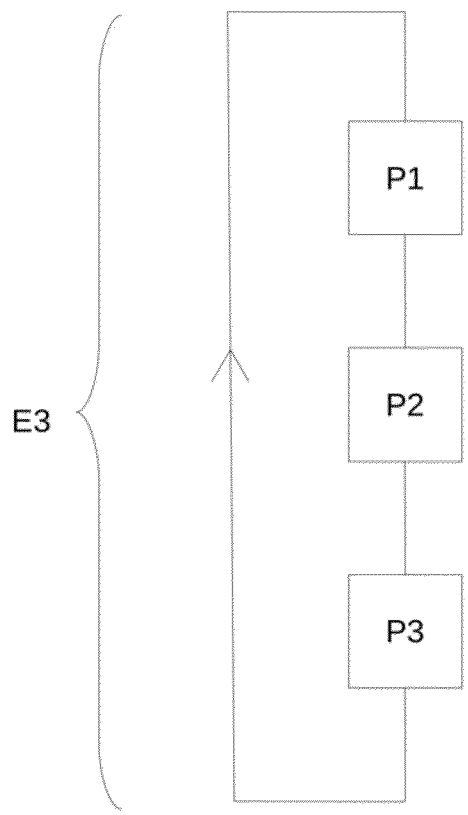
FIG. 3 is a flowchart which details the step E3 of the method according to an aspect of the invention.

As may be seen in FIG. 3, the step E3 of transitioning to the operational state of the method comprises a phase P1 of re-establishing the activity of the wheel unit 16a, which consists in re-establishing the consumption of the wheel unit 16a at a nominal level of consumption of power drawn from the battery 24, that is to say a level of power consumption which makes normal operation of the wheel unit 16a possible.

Following the phase P1 of re-establishing the activity of the wheel unit 16a, the step E3 of the method comprises a phase P2 of resetting the wheel unit 16a which is intended to refresh the context of the wheel unit 16a.

The phase P2 of resetting the wheel unit 16a consists in acquiring the inflation pressure of the tire of the wheel 14a associated with the wheel unit 16a, via the pressure sensor provided for this purpose, and to acquire the acceleration of the associated wheel 14a via the accelerometer provided for this purpose.

In addition, the reset phase P2 consists in carrying out a self-diagnosis intended to check for the absence of a major error and intended to recalibrate the various clock signals.

Finally, the reset phase P2 checks the no-load voltage at the terminals of the battery 24.

Following this reset phase P2, the step E3 of transitioning to the operational state comprises a phase P3 during which the wheel unit 16a transmits a second warning message M2, warning of a return to an operational state, to the central unit 12 of the motor vehicle 10.

The central unit 12, thus warned, will be able to adapt its behavior to the situation if necessary.

For example, the central unit 12 may relaunch a phase of partially locating the wheel unit 16a, via a localization algorithm provided for this purpose.

According to a first variant embodiment of the invention, the method implements a test of the integrity of the battery 24 which makes it possible to check the integrity and the correct operation of the battery 24 following the return to an operational state of the wheel unit 16a, after transitioning through a non-operational state.

In a first stage, the integrity test consists in calculating a first voltage drop which corresponds to the difference between a first no-load voltage and a first on-load voltage of the battery 24 when the wheel unit 16a is in its non-operational state, and before the activity of the wheel unit 16a is limited.

The first no-load voltage of the battery 24 is taken during the step E1 of the method, for example just before the first warning message M1 is transmitted.

Also, the first on-load voltage of the battery 24 is measured while the first warning message M1 by the wheel unit 16a is being transmitted, during the step E1 of the method.

The first voltage drop is stored in the memory of the wheel unit 16a, preferably in a portion of the memory of the non-volatile type which resists a hot reset.

In a second stage, the integrity test consists in calculating a second voltage drop which corresponds to the difference between a second no-load voltage and a second on-load voltage of the battery 24 when the wheel unit 16a is in an operational state, following a transition to a non-operational state, and after the activity of the wheel unit 16a at a nominal level of power consumption is re-established.

In other words, the second voltage drop is calculated when the temperature parameter T reaches a temperature below the lower threshold Sb.

The second no-load voltage of the battery 24 is taken during the step E3 of the method, for example just before the second warning message M2 is transmitted.

Also, the second on-load voltage of the battery 24 is measured while the second warning message M2, warning of a return to an operational state, is being transmitted by the wheel unit 16*a*.

The second voltage drop is stored in the memory of the wheel unit 16*a*, preferably in a portion of the memory of the non-volatile type which resists a hot reset.

Finally, in a third stage, the integrity test consists in calculating an integrity index, for example during the phase P3 of the step E3 of transition to the operational state of the method.

The integrity index is an index which corresponds to the difference between the first voltage drop and the second voltage drop, and which makes it possible to establish a diagnosis.

Indeed, if the integrity index exceeds a predetermined tolerance value, then the integrity test is negative and the battery 24 is considered to be damaged.

According to one example of an implementation of the integrity test, the tolerance value is, for example, predefined at a value which corresponds to plus or minus ten percent of the first voltage drop.

If the integrity test is negative, a strategy to be applied to the wheel unit 16*a* should be adopted, such as transitioning to a definitive non-operational state or holding the wheel unit 16*a* in an operational state but while storing the information corresponding to the negative integrity test in the memory of the wheel unit 16*a*.

According to a second variant embodiment of the invention, if the return to an operational state of the wheel unit 16*a* occurs when the motor vehicle 10 is stationary, then the second warning message M2, warning of a return to an operational state, to the central unit 12 of the motor vehicle 10 is transmitted again by the wheel unit 16*a* as soon as the motor vehicle 10 starts moving again.

This second variant embodiment makes it possible to guarantee that the second warning message M2, warning of a return to an operational state, is received correctly by the central unit 12.

Indeed, when the vehicle is stationary, the wheel unit 16*a* may be in a position in which its transmitter 28 is masked, thus preventing the central unit 12 from receiving the message sent by the wheel unit 16*a*.

Likewise, the method according to an aspect of the invention incorporates a procedure of waking up the central unit 12 which is provided in order to guarantee that the second warning message M2 and the first warning message M1, to the central unit 12, are received correctly.

Thus, an aspect of the present invention makes it possible to limit the operational behavior of a wheel unit over a restricted temperature range.

Also, an aspect of the present invention makes it possible to use a battery which has a more restricted temperature range, thereby notably making it possible to limit the cost of the battery.

Naturally, an aspect of the invention is described in the preceding text by way of example. It is understood that a person skilled in the art is able to produce various variant embodiments of the invention without thereby departing from the scope of the invention.

For example, the operating parameter monitored for the transition of the wheel unit 16*a* to a non-operational state may be a parameter other than the temperature of the wheel unit 16*a*, such as an acceleration parameter of the wheel unit 16*a* supplied by the accelerometer.

The invention claimed is:

1. A method for protecting a battery of a wheel unit fitted to a wheel of a motor vehicle, said motor vehicle comprising a central processing unit and a radio-frequency receiver, and said wheel unit comprising at least:
   a first sensor capable of measuring and of supplying an operating parameter of the wheel unit, a transmitter adapted to transmit messages to the receiver from the central unit of the motor vehicle, and
   a battery which supplies the wheel unit with power,
   the method comprising:
   the wheel unit transitioning from an operational state to a non-operational state when said operating parameter reaches a predetermined upper threshold, the transition to the non-operational state causing an activity of the wheel unit to be limited to a predetermined level of consumption of power drawn from the battery, which predetermined level makes it possible at least to monitor said operating parameter, and
   the wheel unit transitioning from the non-operational state to the operational state when said operating parameter reaches a predetermined lower threshold, the transition to the operational state successively causing the activity of the wheel unit corresponding to a nominal level of consumption of power drawn from the battery to be re-established.

2. The method as claimed in claim 1, wherein the wheel unit transmits a first warning message to the central unit of the motor vehicle when said operating parameter reaches a predetermined critical threshold, upstream of the transition to ato the non-operational state.

3. The method as claimed in claim 2, wherein, after the first warning message has been received, the central unit warns a driver of the motor vehicle of the imminence of a malfunction of the wheel unit by a first signal.

4. The method as claimed in claim 2, further incorporating a procedure of waking up the central unit which is provided in order to guarantee that a second warning message warning of a return to the operational state and the first warning message, to the central unit, are received correctly.

5. The method as claimed in claim 2, wherein the transition to the operational state of the wheel unit causes a second warning message warning of a return to the operational state to be transmitted from the wheel unit to the central unit of the motor vehicle.

6. The method as claimed in claim 1, wherein the transition to the operational state of the wheel unit causes a second warning message warning of a return to the operational state to be transmitted from the wheel unit to the central unit of the motor vehicle.

7. The method as claimed in claim 6, further incorporating a procedure of waking up the central unit which is provided in order to guarantee that the second warning message warning of a return to the operational state and the first warning message, to the central unit, are received correctly.

8. The method as claimed in claim 6, further incorporating a procedure of waking up the central unit which is provided in order to guarantee that second warning message warning of a return to the operational state and the first warning message, to the central unit, are received correctly.

9. The method as claimed in claim 1, wherein, after transitioning of the wheel unit from the non-operational state to the operational state, the wheel unit is reset.

10. The method as claimed in claim 1, wherein, after transitioning of the wheel unit from the non-operational state to the operational state, the method further comprises a test of an integrity of the battery to check the integrity of the battery.

11. The method as claimed in claim 10, wherein the integrity test comprises:
  calculating a first voltage drop of the battery which corresponds to a difference between a first no-load voltage and a first on-load voltage of the battery when the wheel unit is in the non-operational state, and before the activity of the wheel unit is limited,
  calculating a second voltage drop which corresponds to a difference between a second no-load voltage and a second on-load voltage of the battery when the wheel unit is in the operational state, following the transition to the non-operational state, and after the activity of the wheel unit at a nominal level of power consumption is re-established, and calculating an integrity index which corresponds to a difference between the first voltage drop and the second voltage drop, and establishing a diagnosis of the integrity of the battery according to said calculated integrity index.

12. The method as claimed in claim 1, wherein the first sensor is a temperature sensor and said operating parameter measured by the first sensor is a temperature.

13. A motor vehicle which comprises at least a central unit and a wheel unit which are suitably programmed to implement the method as claimed in claim 1.

* * * * *